(12) United States Patent
Berry (10) Patent No.: US 9,243,803 B2
(45) Date of Patent: Jan. 26, 2016

(54) SYSTEM FOR COOLING A MULTI-TUBE FUEL NOZZLE

(75) Inventor: Jonathan Dwight Berry, Simpsonville, SC (US)

(73) Assignee: GENERAL ELECTRIC COMPANY, Schenectady, NY (US)

(*) Notice: Subject to any disclaimer, the term of this patent is extended or adjusted under 35 U.S.C. 154(b) by 1076 days.

(21) Appl. No.: 13/267,828

(22) Filed: Oct. 6, 2011

(65) Prior Publication Data

US 2013/0086912 A1    Apr. 11, 2013

(51) Int. Cl.
    F23R 3/28    (2006.01)

(52) U.S. Cl.
    CPC ............... *F23R 3/283* (2013.01); *F23R 3/286* (2013.01); *F23D 2214/00* (2013.01); *F23R 2900/03043* (2013.01); *F23R 2900/03044* (2013.01); *Y02T 50/675* (2013.01)

(58) Field of Classification Search
    CPC ............ F23R 3/286; F23R 3/283; F23R 3/20; F23R 2900/03044
    USPC .................................................. 60/747, 746
    See application file for complete search history.

(56) References Cited

U.S. PATENT DOCUMENTS

| | | | |
|---|---|---|---|
| 3,042,368 A | 7/1962 | Cook | |
| 4,100,733 A | 7/1978 | Striebel et al. | |
| 4,300,514 A | 11/1981 | Schaich | |
| 4,408,461 A * | 10/1983 | Bruhwiler et al. | 60/737 |
| 4,491,272 A | 1/1985 | Bradley et al. | |
| 4,820,127 A | 4/1989 | Cohen et al. | |
| 5,163,287 A | 11/1992 | Shekleton et al. | |
| 5,235,814 A | 8/1993 | Leonard | |
| 5,247,790 A | 9/1993 | Donlan et al. | |
| 5,274,991 A * | 1/1994 | Fitts | 60/800 |
| 5,423,674 A | 6/1995 | Knopfel et al. | |
| 5,487,659 A | 1/1996 | Eroglu et al. | |
| 5,752,380 A | 5/1998 | Bosley et al. | |
| 5,765,376 A | 6/1998 | Zarzalis et al. | |
| 6,256,995 B1 | 7/2001 | Sampath et al. | |
| 6,298,667 B1 | 10/2001 | Glynn et al. | |
| 6,363,724 B1 | 4/2002 | Bechtel et al. | |
| 6,662,547 B2 | 12/2003 | Mandai et al. | |

(Continued)

OTHER PUBLICATIONS

EP Search Report and Written Opinion dated Feb. 28, 2014 issued in connection with corresponding EP Application No. 12187222.0.

(Continued)

*Primary Examiner* — Phutthiwat Wongwian
*Assistant Examiner* — Rene Ford
(74) *Attorney, Agent, or Firm* — Fletcher Yoder, P.C.

(57) ABSTRACT

A system includes a multi-tube fuel nozzle including a fuel nozzle head that includes an outer wall surrounding a chamber. The outer wall includes a downstream wall portion configured to face a combustion region. The multi-tube fuel nozzle also includes multiple tubes extending through the chamber to the downstream wall portion. Each tube of the multiple tubes includes an upstream portion, a downstream portion, and at least one fuel inlet disposed at the upstream portion, and is configured to receive air and mix the air with fuel from the at least one fuel inlet. The multi-tube fuel nozzle includes a fuel conduit extending through the chamber crosswise to and around the multiple tubes. The fuel conduit includes multiple impingement cooling orifices. A fuel flow path extends through the fuel conduit, through the impingement cooling orifices, through the chamber, and into the at least one fuel inlet of each tube.

16 Claims, 7 Drawing Sheets

(56) References Cited

U.S. PATENT DOCUMENTS

| | | | |
|---|---|---|---|
| 6,698,207 B1 | 3/2004 | Wiebe et al. | |
| 6,702,574 B1 | 3/2004 | Dobbeling | |
| 6,786,046 B2 | 9/2004 | Wiebe et al. | |
| 6,820,424 B2 | 11/2004 | Oechsle et al. | |
| 7,406,955 B1 | 8/2008 | Gachik et al. | |
| 7,654,088 B2 | 2/2010 | Shafique et al. | |
| 7,886,991 B2* | 2/2011 | Zuo et al. | 239/13 |
| 8,112,999 B2* | 2/2012 | Zuo | 60/730 |
| 8,276,385 B2* | 10/2012 | Zuo et al. | 60/737 |
| 8,424,311 B2* | 4/2013 | York et al. | 60/737 |
| 8,616,002 B2* | 12/2013 | Kraemer et al. | 60/737 |
| 8,801,428 B2* | 8/2014 | Melton et al. | 431/2 |
| 2003/0049130 A1 | 3/2003 | Miller | |
| 2010/0031662 A1 | 2/2010 | Zuo | |
| 2010/0084490 A1 | 4/2010 | Zuo et al. | |
| 2010/0218501 A1* | 9/2010 | York et al. | 60/737 |
| 2010/0287942 A1 | 11/2010 | Zuo et al. | |
| 2011/0073684 A1 | 3/2011 | Johnson et al. | |
| 2013/0074510 A1* | 3/2013 | Berry | 60/772 |
| 2013/0081400 A1* | 4/2013 | Rohrssen et al. | 60/772 |

OTHER PUBLICATIONS

A European Search Report and Opinion issued in connection with corresponding EP Application No. 15156150.3 on Jul. 13, 2015.

* cited by examiner

SYSTEM FOR COOLING A MULTI-TUBE FUEL NOZZLE

BACKGROUND OF THE INVENTION

The subject matter disclosed herein relates to a turbine engine and, more specifically, to a turbine fuel nozzle with cooling features.

A gas turbine engine combusts a mixture of fuel and air to generate hot combustion gases, which in turn drive one or more turbine stages. In particular, the hot combustion gases force turbine blades to rotate, thereby driving a shaft to rotate one or more loads, e.g., an electrical generator. The gas turbine engine includes a fuel nozzle to inject fuel and air into a combustor. Unfortunately, a portion of the fuel nozzle may experience high temperatures, which can result in potential damage to the fuel nozzle.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In accordance with a first embodiment, a system includes a multi-tube fuel nozzle including a fuel nozzle head that includes an outer wall surrounding a chamber. The outer wall includes a downstream wall portion configured to face a combustion region. The multi-tube fuel nozzle also includes multiple tubes extending through the chamber to the downstream wall portion. Each tube of the multiple tubes includes an upstream portion, a downstream portion, and at least one fuel inlet disposed at the upstream portion, and is configured to receive air and mix the air with fuel from the at least one fuel inlet. The multi-tube fuel nozzle further includes a fuel conduit extending through the chamber crosswise to and around the multiple tubes. The fuel conduit includes multiple impingement cooling orifices. A fuel flow path extends through the fuel conduit, through the impingement cooling orifices, through the chamber, and into the at least one fuel inlet of each tube.

In accordance with a second embodiment, a system includes a turbine combustor. The turbine combustor includes a multi-tube fuel nozzle coupled to the turbine combustor. The multi-tube fuel nozzle includes a fuel nozzle body that includes an outer wall surrounding a chamber and multiple tubes extending through the chamber. Each tube of the multiple tubes includes an air inlet, a fuel inlet, and an air-fuel mixture outlet. The multi-fuel nozzle also includes multiple impingement cooling orifices configured to direct fuel to impingement cool the multi-tube fuel nozzle.

In accordance with a third embodiment, a system includes a multi-tube fuel nozzle. The multi-tube fuel nozzle includes a fuel nozzle body that includes an outer wall surrounding a chamber and multiple tubes extending through the chamber from a first wall portion to a second wall portion of the outer wall. Each tube of the multiple tubes includes an air inlet, a fuel inlet, and an air-fuel mixture outlet. The multi-tube fuel nozzle also includes a fuel conduit extending through the chamber crosswise to and around the multiple tubes, wherein the fuel conduit includes multiple impingement cooling orifices configured to direct fuel to impingement cool the outer wall, and the fuel conduit includes multiple openings configured to direct the fuel to convectively cool the plurality of tubes and the outer wall.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Embodiments of the present disclosure provide a system that includes a multi-tube fuel nozzle with different cooling features to improve the operability and durability of the fuel nozzle. For example, a multi-tube fuel nozzle may include a fuel nozzle head that includes an outer wall that surrounds a chamber, where the outer wall includes a downstream wall portion that faces a combustion region. Multiple tubes extend through the chamber to the downstream wall portion, where each tube includes an upstream portion, a downstream portion, and at least one fuel inlet disposed at the upstream portion. Each tube is configured to receive air and mix the air with fuel from the at least one fuel inlet. A fuel conduit extends through the chamber crosswise to and around the multiple tubes. The fuel conduit includes multiple impingement cooling orifices. A fuel flow path extends through the fuel conduit, through the impingement cooling orifices, through the chamber, and into the at least one fuel inlet of each tube. The multiple impingement cooling orifices may direct fuel to impingement cool the downstream wall portion. In certain embodiments, the fuel conduit may include a first and second baffle spaced apart from one another. The second baffle may be disposed between the first baffle and the downstream wall portion and include an impingement cooling plate having the multiple impingement cooling orifices. The multiple tubes may extend through openings in the baffles, where the openings are oversized relative to the tubes to define gaps between the tubes and baffles. These gaps may direct fuel to convectively cool the tubes and/or the downstream wall portion. In addition, these gaps may shrink in response to thermal expansion of the tubes to increase fuel flow through the multiple impingement cooling orifices. The cooling features of these embodiments may cool the downstream wall portion (e.g., face of fuel nozzle head) and/or tubes to increase the operability and durability of the fuel nozzle.

Figure 1:
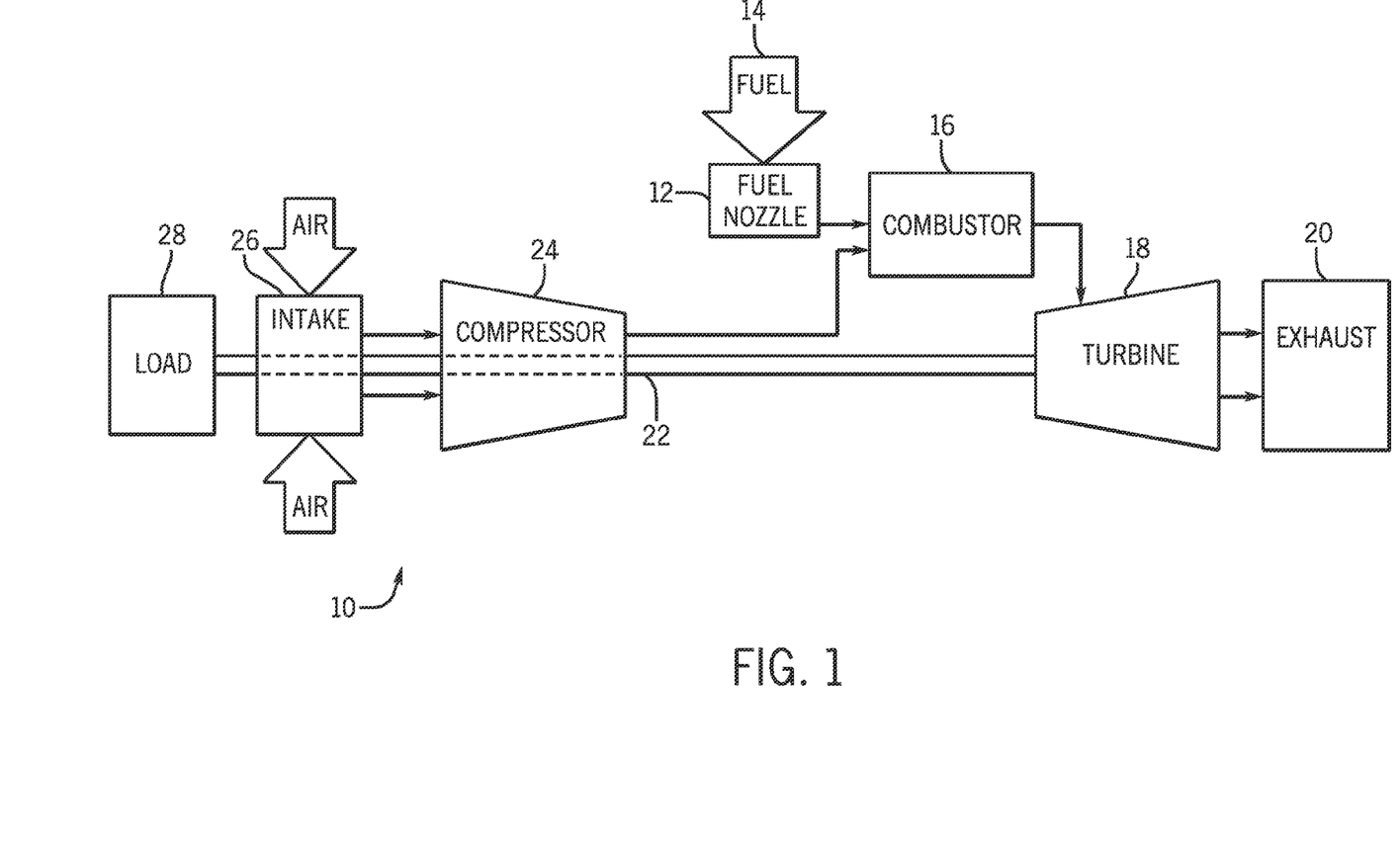
FIG. 1 is a block diagram of an embodiment of a turbine system having a fuel nozzle with an improved design to enhance operability and durability.

Turning now to the drawings and referring first to FIG. 1, a block diagram of an embodiment of a turbine system 10 is illustrated. As described in detail below, the disclosed turbine system 10 (e.g., a gas turbine engine) may employ one or more fuel nozzles 12 (e.g., multi-tube fuel nozzles) with an improved design to increase operability and durability of the fuel nozzles 12 in the turbine system 10. For example, certain fuel nozzles 12 (e.g., a multi-tube fuel nozzle) include different cooling features (e.g., impingement cooling orifices for impingement cooling and/or gaps for convective cooling) configured to cool components of each fuel nozzle 12 by directing fuel towards and/or along these components. For example, these cooling features may direct fuel along a plurality of tubes (e.g., premixing tubes) and/or towards a downstream wall portion of a fuel nozzle body (e.g., fuel nozzle head) configured to face a combustion region of each fuel nozzle 12. As a result, these cooling features enable the fuel nozzles 12 to use the fuel to cool these components without the need for superfluous flow streams such as air or water. In addition, these cooling features increase the operability (e.g., enabling operation at a slightly higher fuel pressure ratio) and durability of the fuel nozzles 12. In certain embodiments, the system 10 includes a plurality of fuel nozzles 12 arranged around a central fuel nozzle 12. One or more of these fuel nozzles 12 may include the flow control features discussed in detail below.

The turbine system 10 may use liquid or gas fuel, such as natural gas and/or a hydrogen rich synthetic gas, to drive the turbine system 10. As depicted, one or more fuel nozzles 12 intake a fuel supply 14, mix the fuel with air, and distribute the air-fuel mixture into a combustor 16 in a suitable ratio for optimal combustion, emissions, fuel consumption, and power output. The turbine system 10 may include one or more fuel nozzles 12 located inside one or more combustors 16. The air-fuel mixture combusts in a chamber within the combustor 16, thereby creating hot pressurized exhaust gases. The combustor 16 directs the exhaust gases through a turbine 18 toward an exhaust outlet 20. As the exhaust gases pass through the turbine 18, the gases force turbine blades to rotate a shaft 22 along an axis of the turbine system 10. As illustrated, the shaft 22 may be connected to various components of the turbine system 10, including a compressor 24. The compressor 24 also includes blades coupled to the shaft 22. As the shaft 22 rotates, the blades within the compressor 24 also rotate, thereby compressing air from an air intake 26 through the compressor 24 and into the fuel nozzles 12 and/or combustor 16. The shaft 22 may also be connected to a load 28, which may be a vehicle or a stationary load, such as an electrical generator in a power plant or a propeller on an aircraft, for example. The load 28 may include any suitable device capable of being powered by the rotational output of the turbine system 10.

Figure 2:
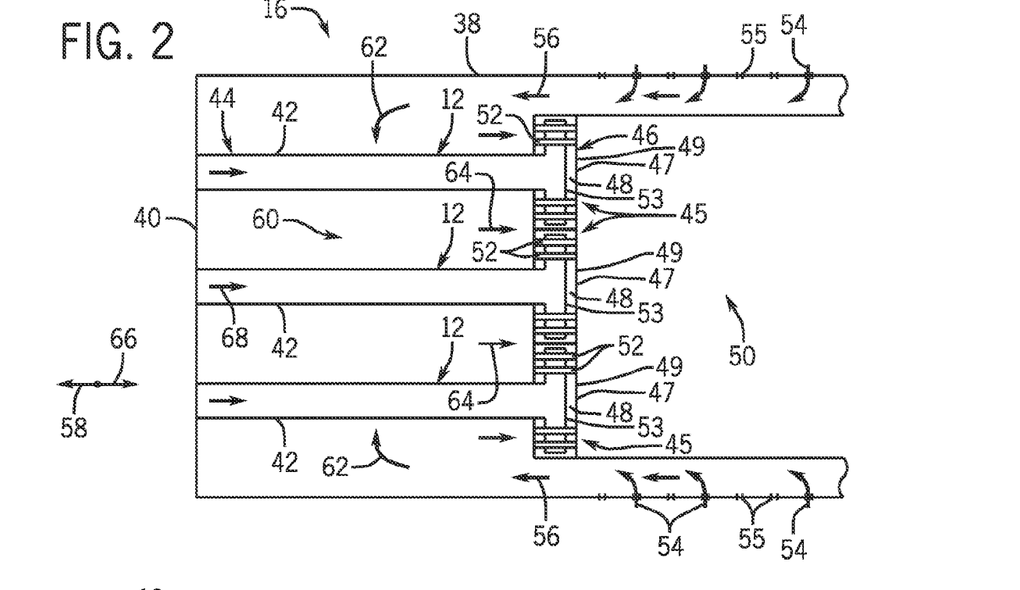
FIG. 2 is a cross-sectional side view of an embodiment of a combustor of FIG. 1 with multiple fuel nozzles.

FIG. 2 is a cross-sectional side view of an embodiment of the combustor 16 of FIG. 1 with multiple fuel nozzles 12. The combustor 16 includes an outer casing or flow sleeve 38 and an end cover 40. Multiple fuel nozzles 12 (e.g., multi-tube fuel nozzles) are mounted within the combustor 16. Each fuel nozzle 12 includes a fuel conduit 42 extending from an upstream end portion 44 to a downstream end portion 46 of the nozzle 12. The downstream end portion 46 of each fuel nozzle 12 includes a fuel nozzle body 45 (e.g., fuel nozzle head) that includes an outer wall 47 surrounding a chamber 48 (e.g., fuel chamber) coupled to the fuel conduit 42. The outer wall 47 includes a downstream wall portion 49 configured to face a combustion region 50. In addition, each fuel nozzle 12 includes a plurality of tubes 52 (e.g., premixing tubes) extending through the chamber 48 to the downstream wall portion 49 as described in greater detail below. The fuel conduit 42 extends through the chamber 48 crosswise to and around the plurality of tubes 52. The fuel conduit 42 may include one or more baffles 53 (e.g., first and second baffles spaced apart). In certain embodiments, at least one baffle 53 (e.g., floating baffle) may be configured to float (e.g., move) relative to the plurality of tubes 52.

Air (e.g., compressed air) enters the flow sleeve 38 (as generally indicated by arrows 54) via one or more air inlets 55, and follows an upstream airflow path 56 in an axial direction 58 towards the end cover 40. Air then flows into an interior flow path 60, as generally indicated by arrows 62, and proceeds along a downstream airflow path 64 in the axial direction 66 through the plurality of tubes 52 of each fuel nozzle 12. Fuel flows in the axial direction 66 along a fuel flow path 68 through each fuel conduit 42 towards the downstream end portion 46 of each fuel nozzle 12. Fuel then enters the chamber 48 of each fuel nozzle 12 and mixes with air within the plurality of tubes 52 as described in greater detail below. The fuel nozzles 12 inject the air-fuel mixture into the combustion region 50 in a suitable ratio for optimal combustion, emissions, fuel consumption, and power output.

As discussed in detail below, each fuel nozzle 12 may include features to cool components of the nozzle 12. For example, the baffle 53 disposed near the downstream wall portion 49 may include a plurality of impingement cooling orifices configured to direct fuel to cool the downstream wall portion 49. As a result, each fuel flow path 68 extends through the fuel conduit 42, through the impingement cooling orifices, through the chamber 48, and into at least one fuel inlet of each tube 52. In addition, each tube 52 of the plurality of tubes 52 may extend through openings of the fuel conduit 42 and/or the one or more baffles 53. The openings may be oversized relative to each tube 52 to define gaps between the fuel conduit 42 and/or the one or more baffles 53 and each tube 52. Each gap may be configured to direct fuel to convectively cool the adjacent tube 52 and/or the downstream wall portion 49. Also, each gap may be configured to shrink in response to thermal expansion of the adjacent tube 52 to increase fuel flow through the plurality of impingement orifices. As a result, these cooling features enable the fuel nozzles 12 to use the fuel to cool these components without the need for superfluous flow streams such as air or water. In addition, these cooling features increase the operability (e.g., enabling operation at a slightly higher fuel pressure ratio) and durability of the fuel nozzles 12.

Figure 3:
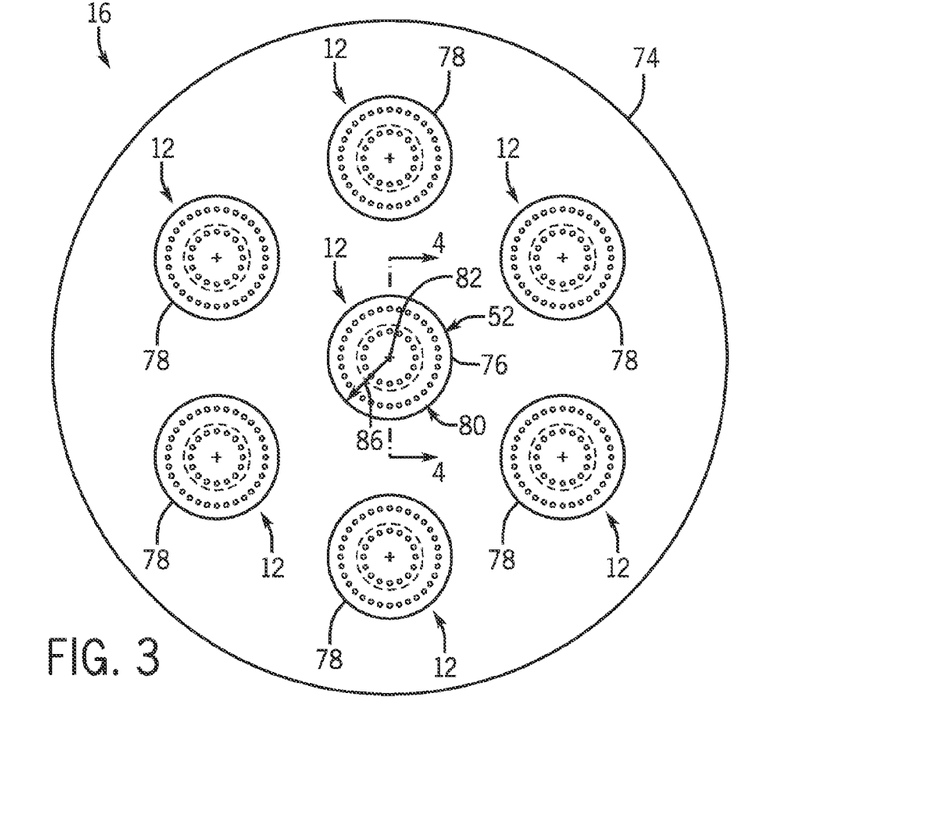
FIG. 3 is a front plant view of an embodiment of the combustor including the multiple fuel nozzles (e.g., circular-shaped)

FIG. 3 is a front plan view of an embodiment of the combustor 16 including multiple fuel nozzles 12 (e.g., multi-tube fuel nozzles). The combustor 16 includes a cap member 74 with multiple fuel nozzles 12 disposed therethrough. As illustrated, the combustor 16 includes a fuel nozzle 12 (e.g., center fuel nozzle 76) centrally located within the cap member 74 of the combustor 16. The combustor 16 also includes multiple fuel nozzles 12 (e.g., outer fuel nozzles 78) disposed circumferentially about the center fuel nozzle 76. As illustrated, six outer fuel nozzles 78 surround the center fuel nozzle 76. However, in certain embodiments, the number of fuel nozzles 12 as well as the arrangement of the fuel nozzles 12 may vary. For example, the fuel nozzles 12 may be arranged as described in U.S. patent application Ser. No. 12/394,544 filed on Feb. 27, 2009, which is hereby incorporated by reference in its entirety. Each fuel nozzle 12 includes the plurality of tubes 52. As illustrated, the plurality of tubes 52 of each fuel nozzle 12 is arranged in multiple rows 80 (e.g., rings). The rows 80 have a concentric arrangement about a central axis 82 of each fuel nozzle 12. In certain embodiments, the number of rows 80, number of tubes 52 per row 80, and arrangement of the plurality of tubes 52 may vary. In certain embodiments, the fuel nozzles 12 may include at least one of the different cooling features mentioned above (e.g., impingement cooling orifices for impingement cooling and/or gaps for convective cooling). In certain embodiments, only the center fuel nozzle 76 may include at least one of the cooling features. Alternatively, in certain embodiments, only the outer fuel nozzles 78 may include at least one of the cooling features. In some embodiments, both the center and outer fuel nozzles 76 and 78 may include at least one of the cooling features.

Figure 4:
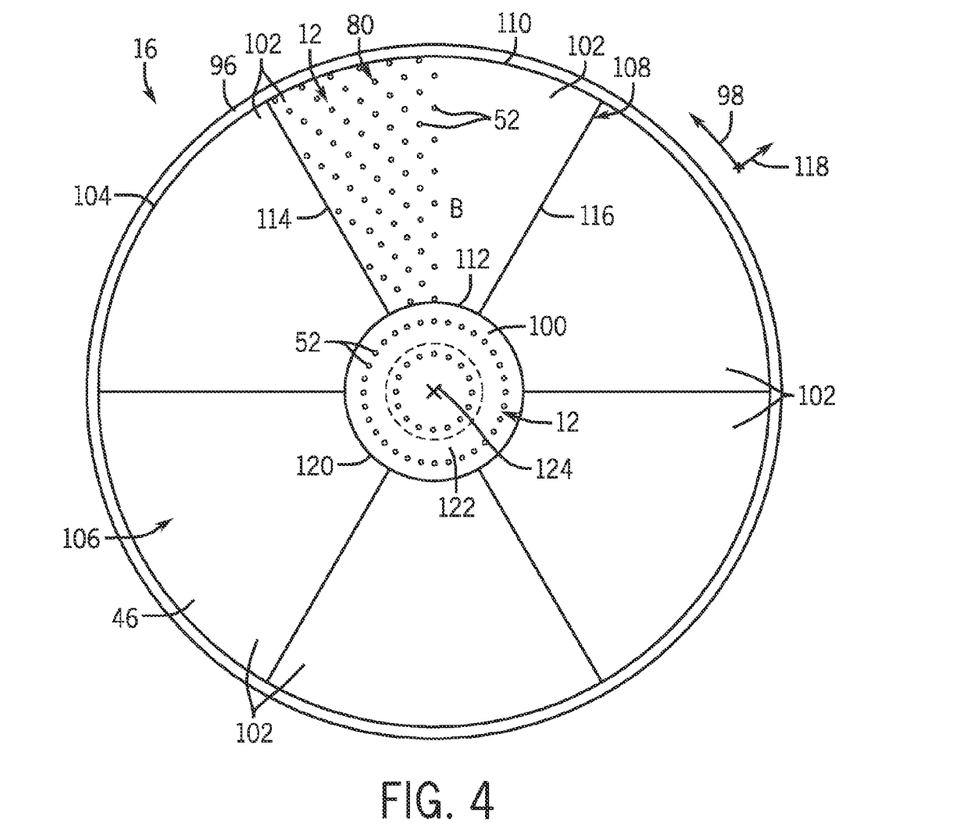
FIG. 4 is a front plan view of an embodiment of the combustor including the multiple fuel nozzles (e.g., truncated pie-shaped)

FIG. 4 is a front plan view of another embodiment of the combustor 16 including multiple fuel nozzles 12 (e.g., multi-tube fuel nozzles). The combustor 16 includes a cap member 96. Cap member 96 is disposed circumferentially about the fuel nozzles 12 in direction 98. As illustrated, the combustor 16 include a center fuel nozzle 100 and multiple fuel nozzles 12 (e.g., outer fuel nozzles 102) disposed circumferentially about the center fuel nozzle 100. As illustrated, six outer fuel nozzles 102 surround the center fuel nozzle 100. However, in certain embodiments, the number of fuel nozzles 12 as well as the arrangement of the fuel nozzles 12 may vary. For example, the number of outer fuel nozzles 102 may be 1 to 20, 1 to 10, or any other number. The fuel nozzles 12 are tightly disposed within the cap member 96. As a result, an inner perimeter 104 of the cap member 96 defines a circular nozzle area 106 for the combustor 16. The downstream end portions 46 of the fuel nozzles 12 encompass the entire circular nozzle area 106. Each outer fuel nozzle 102 includes a non-circular perimeter 108. As illustrated, the perimeter 108 includes a wedge shape or truncated pie shape with two generally parallel sides 110 and 112. The sides 110 and 112 are arcuate shaped, while sides 114 and 116 are linear (e.g., diverging in radial direction 118). However, in certain embodiments, the perimeter 108 of the outer fuel nozzles 102 may include other shapes, e.g., a pie shape with three sides. The perimeter 108 of each outer fuel nozzle 102 includes a region of the circular nozzle area 106. The center fuel nozzle 100 includes a perimeter 120 (e.g., circular perimeter). In certain embodiments, the perimeter 120 may include other shapes, e.g., a square, hexagon, triangle, or other polygon. The perimeter 120 of the center fuel nozzle 100 is disposed at a central portion 122 of the circular nozzle area 106.

Each fuel nozzle 12 includes multiple premixing tubes 52. The premixing tubes 52 are only shown on portions of some of the fuel nozzles 12 for clarity. As illustrated, the plurality of tubes 52 of each fuel nozzle 12 are arranged in multiple rows 80. The rows 80 of tubes 52 of the outer fuel nozzles 102 have a concentric arrangement about a central axis 124 of the combustor 16. The rows 80 of tubes 52 of the central fuel nozzle 100 also have a concentric arrangement about the central axis 124 of the combustor 16. In certain embodiments, the number of rows 80, number of tubes 52 per row 80, and arrangement of the plurality of tubes 52 may vary. In certain embodiments, the fuel nozzles 12 may include at least one of the different cooling features mentioned above (e.g., impingement cooling orifices for impingement cooling and/or gaps for convective cooling). In certain embodiments, only the center fuel nozzle 100 may include at least one of the cooling features. Alternatively, in certain embodiments, only the outer fuel nozzles 102 may include at least one of the cooling features. In some embodiments, both the center and outer fuel nozzles 100 and 102 may include at least one of the cooling features.

Figure 5:
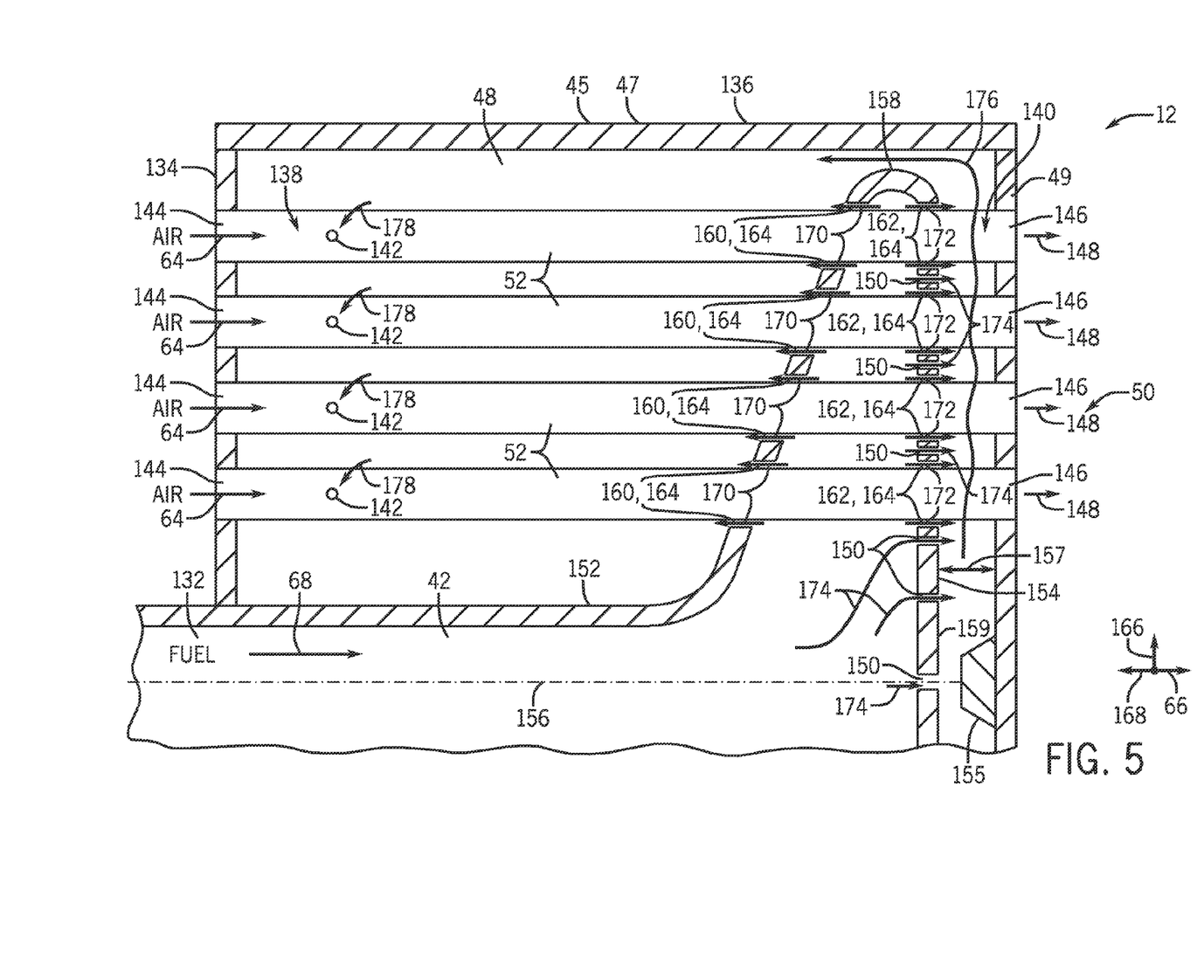
FIG. 5 is a partial cross-sectional side view of an embodiment of a fuel nozzle of FIG. 2 having a single center feed for fuel.

FIGS. 5-8 illustrate various embodiments of fuel nozzles 12 (e.g., multi-tube fuel nozzles) having the cooling features mentioned above. FIG. 5 is a partial cross-sectional side view of an embodiment of the fuel nozzle 12 (e.g., multi-tube fuel nozzle) of FIG. 2 having a single central feed 132 for fuel. The fuel nozzle 12 includes the fuel nozzle body 45 (e.g., fuel nozzle head) that includes the outer wall 47 surrounding the chamber 48 (e.g., fuel chamber). The outer wall 47 includes an upstream wall portion 134, the downstream wall portion 49, and a wall portion 136 disposed between the wall portions 49 and 134. The downstream wall portion 49 is configured to face the combustion region 50.

In addition, the fuel nozzle 12 includes the plurality of tubes 52 (e.g., premixing tubes) extending through the chamber 48 from the upstream wall portion 134 to the downstream wall portion 49. The plurality of tubes 52 are fixed relative to the upstream wall portion 134. Each tube 52 of the plurality of tubes 52 includes an upstream portion 138, a downstream portion 140, at least one fuel inlet 142 disposed at the upstream portion 138, an air inlet 144 disposed upstream of the at least one fuel inlet 142 at the upstream portion 138, and an air-fuel mixture outlet 146 at the downstream portion 140. The number, shape, and arrangement of fuel inlets 142 may vary. For example, each tube 52 may include 1 to 100, 2 to 50, 3 to 25, or 4 to 10 fuel inlets 142. Each tube 52 is configured to receive air via the air inlet 144 and mix the air with fuel from the at least one fuel inlet 142. In addition, each tube 52 is configured to inject the air-fuel mixture 148 via the air-fuel mixture outlet 146 into the combustion region 50.

In addition, the fuel nozzle 12 includes the fuel conduit 42 extending through the chamber 48 crosswise to and around the plurality of tubes 52. As illustrated, the fuel conduit 42 includes a plurality of impingement cooling orifices 150 configured to direct fuel to impingement cool the downstream wall portion 49. Also, the fuel conduit 42 includes first and second baffles 152 and 154 disposed spaced apart from one another. As illustrated, the first and second baffles 152 and 154 are disposed about an axis 156 (e.g., longitudinal axis) of the fuel nozzle 12. The second baffle 154 is disposed between the first baffle 152 and the downstream wall portion 49. A spacer 155 is disposed between the downstream wall portion 49 and the second baffle 154 and is configured to maintain a gap 157 between the wall portion 49 and the baffle 154. The second baffle 154 includes the plurality of impingement cooling orifices 150. The size of the gap 157 may be dependent on the size of the plurality of impingement cooling orifices 150.

As illustrated, the first and second baffles 152 and 154 extend crosswise to the plurality of tubes 52. In particular, the first baffle 152 extends crosswise to the plurality of tubes 52 at an angle before interfacing with the second baffle 152 at interface 158 (e.g., curved interface). In certain embodiments, at least one or both of the baffles 152 and 154 includes a floating baffle configured to float relative to the plurality of tubes 52. In some embodiments, the second baffle 154 is the floating baffle; while in other embodiments, both the first and second baffles 152 and 154 are floating baffles. The floating baffle 154 includes an impingement cooling plate 159 having the impingement cooling orifices 150. In certain embodiments, the first and second baffles 152 and 154 may be brazed or are welded together (e.g., at the interface 158). In other embodiments, the first and second baffles 152 and 154 may not be mechanically coupled.

Each tube 52 of the plurality of tubes 52 extends through at least one opening 160 and 162 in the fuel conduit 42. For example, the plurality of tubes 52 extends through the first and second baffles 152 and 154. In particular, each tube 52 of the plurality of tubes 52 extends through a first opening 160 in the first baffle 152 and a second opening 162 in the second baffle 154. The at least one opening 160 and 162 of the fuel conduit 42 is oversized relative to each adjacent tube 52 to define a gap 164 between the fuel conduit 42 and the tube 52. For example, the first and second opening 160 and 162 are oversized relative to each adjacent tube 52 to define gaps 164 between the respective first and second baffles 152 and 154 and the tube 52. Each gap 164 is configured to direct fuel to convectively cool each adjacent tube 52 and/or the downstream wall portion 49. In addition, each gap 164 is configured to shrink in response to thermal expansion of each adjacent tube 52 to increase fuel flow through the plurality of impingement cooling orifices 150. The gaps 164 enable the baffles 152 and 154 to float relative to the plurality of tubes 52. In certain embodiments, the size of the gaps 164 between the first openings 160 of the first baffle 152 and the tubes 52 may be slightly larger than the gaps 164 between the second openings 162 of the second baffle 154 and the tubes 52, or vice versa. In other embodiments, the size of the gaps 164 between the first and second openings 160 and 162 and the tubes 52 may be the same.

Air (e.g., compressed air) enters each tube 52 via the air inlets 144 and follows the downstream airflow path 64 in the axial direction 66 through each tube 52. The temperature of the compressed air may range from approximately 260 to 538° C., 315 to 482° C., or 371 to 427° C. The fuel nozzle 12 includes the fuel flow path 68 that extends through the fuel conduit 42, through the plurality of impingement cooling orifices 150, through the gaps 164, through the chamber 48, and into the fuel inlets 142. Fuel flows in the axial direction 66 through the fuel conduit 42 toward the downstream wall portion 49. The temperature of the fuel may range from approximately −20 to 500° C., 15 to 200° C., 21 to 100° C., or 26 to 38° C. As the fuel approaches the downstream wall portion 49, a portion of the fuel flows in a generally radial direction 166 between the first and second baffles 152 and 154, where the fuel is directed through both the gaps 164 and the plurality of impingement cooling orifices 150. The size of the impingement cooling orifices 150 may range from approximately 0.5 to 3.85 mm, 0.7 to 3.1 mm, or 1.0 to 1.6 mm. The size of the gaps 164 may range from approximately 0.0 to 0.5 mm, 0.02 to 0.12 mm, or 0.05 to 0.08 mm. The fuel flowing through the gaps 164 in both axial directions 168 and 66, as indicated by arrows 170 and 172, convectively cools the plurality of tubes 52 and/or the downstream wall portion 49. Fuel flowing through the plurality of impingement orifices 150 in axial direction 66, as indicated by arrows 174, impingement cools the downstream wall portion 49. Fuel directed through the gaps 164 between the second openings 162 and the tubes 52 and the fuel directed through the impingement orifices 150, as indicated by arrow 176, then travels in the radial direction 166 away from the axis 156 of the fuel nozzle 12 toward the wall portion 136 convectively cooling the downstream wall portion 49 before turning in the axial direction 168 towards the fuel inlets 142 of the tubes 52. Fuel enters the fuel inlets 142 of the tubes 52, as indicated by the arrows 178, where each tube 52 mixes the air with fuel from the fuel inlet 142 and injects the air-fuel mixture 148 via the air-fuel mixture outlet 146 into the combustion region 50.

As conditions increase in temperature, the tubes 52 thermally expand decreasing the size of the gaps 164, increasing the pressure within the baffles 152 and 154, and directing more fuel through the impingement cooling orifices 150 for impingement cooling of the downstream wall portion 49. As mentioned above, in certain embodiments, the size of the gaps 164 between the first openings 160 of the first baffle 152 and the tubes 52 may be slightly larger than the gaps 164 between the second openings 162 of the second baffle 154 and the tubes 52, in order to maintain sufficient pressure to cause impingement cooling of the downstream wall portion 49. However, in other embodiments, the size of the gaps 164 between the first and second openings 160 and 162 and the tubes 52 may be the same. In cold conditions, the fuel split between the impingement cooling orifices 150, the gaps 164 between the first openings 160 and the tubes 52, the gaps 164 between the second openings 162 and the tubes 52 may be approximately 40%, 30%, and 30%, respectively (e.g., 4:3:3). In hot conditions, the fuel split may be 60%, 20%, and 20%, respectively (e.g., 3:1:1). In certain embodiments, the fuel split between the impingement cooling orifices 150 and the various gaps 164 may vary based on gap size, number of impingement cooling orifices 150, size of impingement cooling orifices 150, the operating temperature, and/or other factors. These cooling features enable the fuel nozzle 12 to use the fuel to cool these components without the need for superfluous flow streams such as air or water. In addition, these cooling features increase the operability (e.g., enabling operation at a slightly higher fuel pressure ratio) and durability of the fuel nozzle 12.

Figure 6:
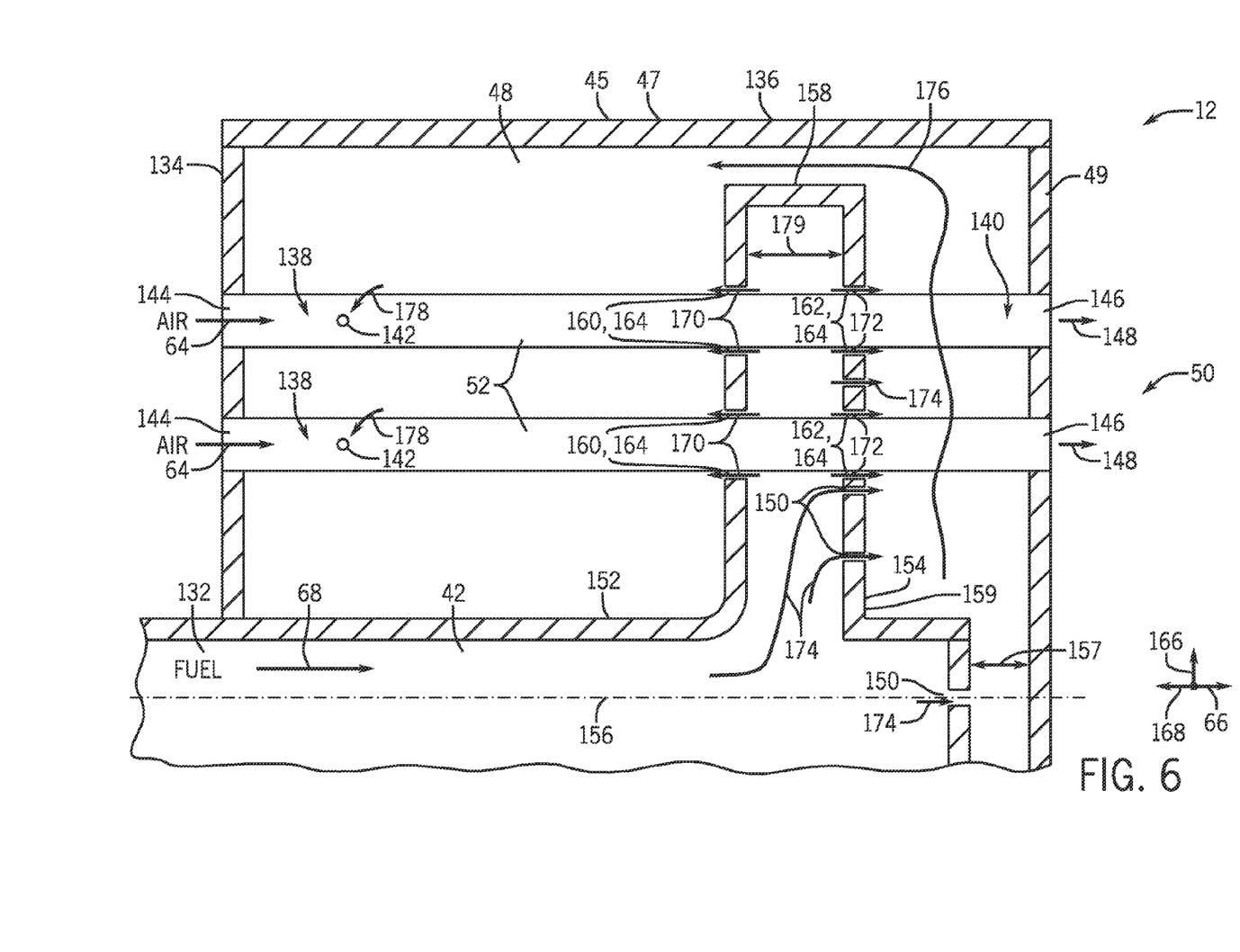
FIG. 6 is a partial cross-sectional side view of an embodiment of a fuel nozzle of FIG. 2 having a single center feed for fuel.

FIG. 6 is a partial cross-sectional side view of an embodiment of the fuel nozzle 12 (e.g., multi-tube fuel nozzle) of FIG. 2 also having the single central feed 132 for fuel. The fuel nozzle 12 in FIG. 6 is structurally similar to the fuel nozzle 12 in FIG. 5 with a few exceptions. First, the fuel nozzle 12 in FIG. 6 includes fewer tubes 52 (e.g., premixing tubes) than in FIG. 5. Second, the first baffle 152 in FIG. 6 directly extends crosswise to the tubes 52 in radial direction 166 without angling towards the second baffle 154 as illustrated in FIG. 5. In other words, the illustrated baffles 152 and 154 are parallel to one another, and are parallel to the downstream wall portion 49. Further, the baffles 152 and 154 and the downstream wall portion 49 are perpendicular to the axis 156. Thus, a gap 179 between the baffles 152 and 154 and the gap 157 between the baffle 154 and the downstream wall portion 49 are generally constant in the radial direction 166. Third, the interface 158 between the first and second baffles 152 and 154 in FIG. 6 is a rectilinear interface. As illustrated, the interface 158 is generally parallel to the axis 156 and the wall portion 136. The fuel nozzle 12 of FIG. 6 and its cooling features function as described above in FIG. 5.

Figure 7:
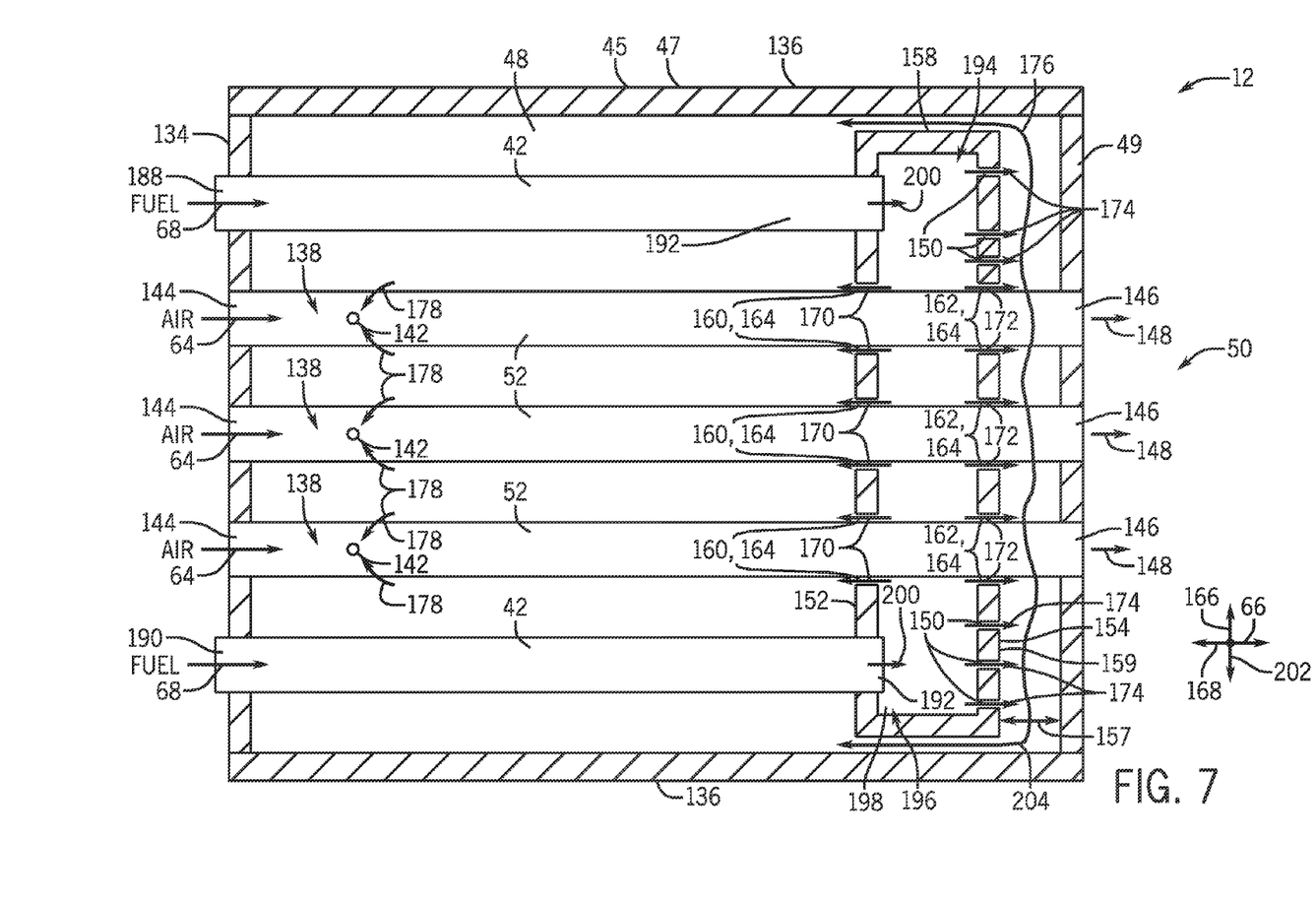
FIG. 7 is a partial cross-sectional side view of an embodiment of a fuel nozzle of FIG. 2 having multiple feeds for fuel.

FIG. 7 is a partial cross-sectional side view of an embodiment of the fuel nozzle 12 (e.g., multi-tube fuel nozzle) of FIG. 2 having multiple feeds 188 and 190 for fuel. In general, the fuel nozzle in FIG. 7 is structurally similar to the fuel nozzles 12 above with a few exceptions. As illustrated, the fuel conduit 42 includes two feeds 188 and 190 for fuel as opposed to the single feed for fuel 132. Each feed 188 and 190 includes a fuel outlet 192 that is joined or fastened to the first baffle 152 at a first end 194 and a second end 196 of a plenum 198 formed by the first and second baffles 152 and 154. The plurality of multiple tubes 52 are disposed between the feeds 188 and 190. In addition, the interface 158 between the first and second baffles 152 and 154 is a rectilinear interface.

The fuel nozzle 12 of FIG. 7 and its cooling features function as described above in FIG. 5. For example, air (e.g., compressed air) enters each tube 52 via the air inlets 144 and follows the downstream airflow path 64 in the axial direction 66 through each tube 52. The temperature of the compressed air may range from approximately 260 to 538° C., 315 to 482° C., or 371 to 427° C. The fuel nozzle 12 includes the fuel flow path 68 that extends through the fuel conduit 42, through the plurality of impingement cooling orifices 150, through the gaps 164, through the chamber 48, and into the fuel inlets 142. Fuel flows in the axial direction 66 through the fuel conduit 42 of both the feeds 188 and 190 and out of the fuel outlets 192 into the plenum 198 as indicated by arrows 200. The temperature of the fuel may range from approximately −20 to 500° C., 15 to 200° C., 21 to 100° C., or 26 to 38° C. Within the plenum 198, a portion of the fuel flows in generally radial directions 202 and 166 from the feeds 188 and 190, respectively. Also, within the plenum 198, fuel is directed through both the gaps 164 and the plurality of impingement cooling orifices 150. The fuel flowing through the gaps 164 in both axial directions 168 and 66, as indicated by arrows 170 and 172, convectively cools the plurality of tubes 52 and/or the downstream wall portion 49. Fuel flowing through the plurality of impingement orifices 150 in axial direction 66, as indicated by arrows 174, impingement cools the downstream wall portion 49. Fuel directed through the gaps 164 between the second openings 162 and the tubes 52 and the fuel directed through the impingement orifices 150, as indicated by arrows 176 and 204, then travels in the radial directions 166 and 202 toward the wall portions 136 convectively cooling the downstream wall portion 49 before turning in the axial direction 168 towards the fuel inlets 142 of the tubes 52. Fuel enters the fuel inlets 142 of the tubes 52, as indicated by the arrows 178, where each tube 52 mixes the air with fuel from the fuel inlet 142 and injects the air-fuel mixture 148 via the air-fuel mixture outlet 146 into the combustion region 50. These cooling features enable the fuel nozzle 12 to use the fuel to cool these components without the need for superfluous flow streams such as air or water. In addition, these cooling features increase the operability (e.g., enabling operation at a slightly higher fuel pressure ratio) and durability of the fuel nozzle 12.

Figure 8:
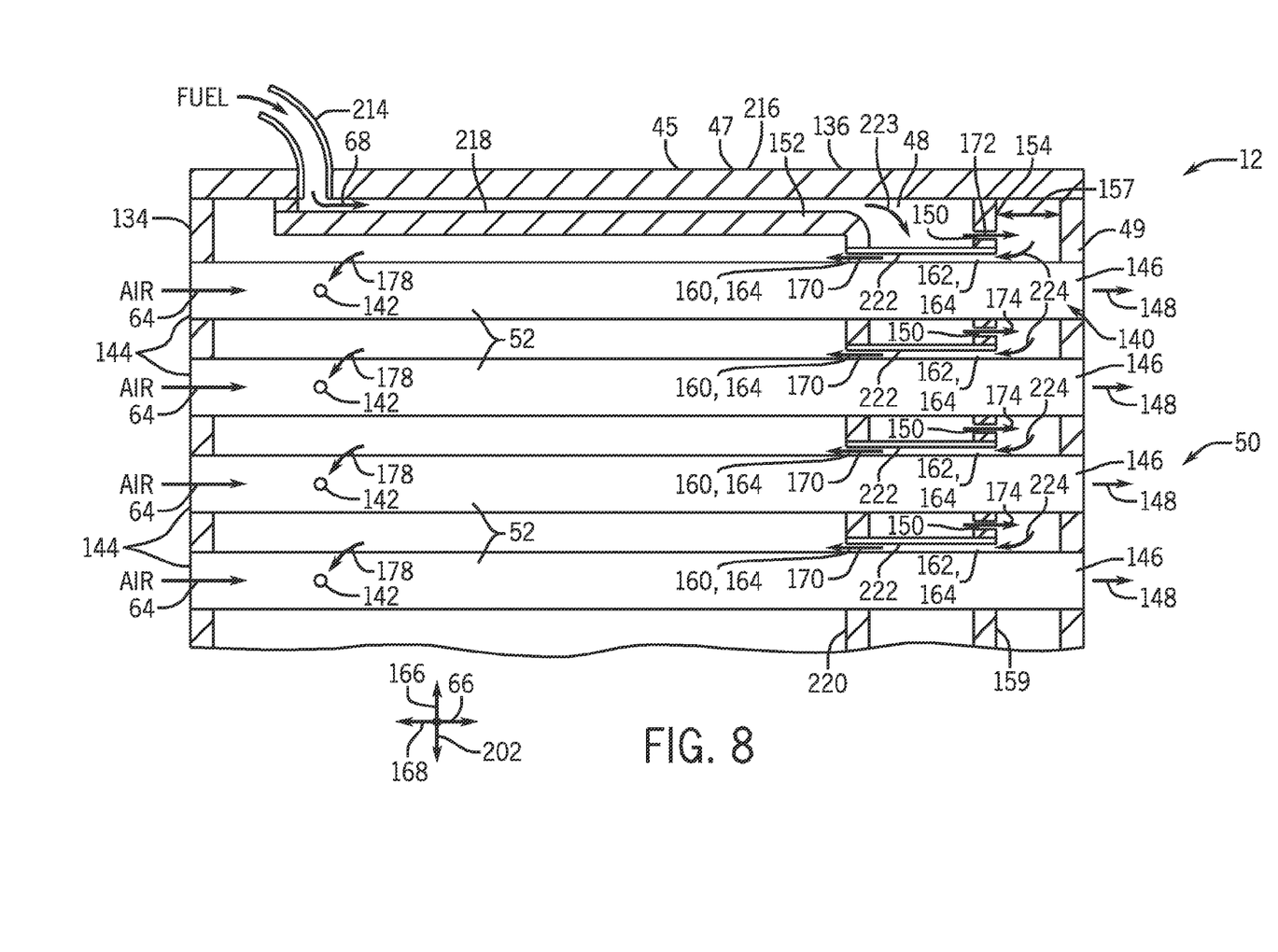
FIG. 8 is a partial cross-sectional side view of an embodiment of a fuel nozzle of FIG. 2 having an external feed for fuel.

FIG. 8 is a partial cross-sectional side view of an embodiment of the fuel nozzle 12 of FIG. 2 having an external feed 214 for fuel. In general, the fuel nozzle in FIG. 7 is structurally similar to the fuel nozzles 12 above with a few exceptions. The fuel nozzle 12 includes an outer shroud 216 (e.g., pie-shaped or annular shroud). As illustrated, the fuel conduit 42 includes at least a single external feed 214 for fuel as opposed to one or more internal feeds for fuel. In addition, the first baffle 152 is not mechanically coupled to the second baffle 154 (e.g., impingement cooling plate 159). A first portion 218 of the first baffle 152, free of holes, extends in axial direction 66 from adjacent the external feed 214 towards the downstream portions 140 of the plurality of tubes 52 and a second portion 220 that extends crosswise to the tubes 52. The second baffle 154 is disposed between first baffle 152 and the downstream wall portion 49, and extends crosswise to the tubes 52 between wall portions 136 of the fuel nozzle 12. In addition, each tube 52 is surrounded by a sleeve 222 (e.g., annular sleeve), which extends between the first baffle 152 and the second baffle 154. In particular, the gaps 164 extend between the sleeves 222 and the respective tubes 52 to define the first and second openings 160 and 162.

The fuel nozzle 12 of FIG. 8 and its cooling features function similarly to the embodiment described above in FIG. 5. For example, air (e.g., compressed air) enters each tube 52 via the air inlets 144 and follows the downstream airflow path 64 in the axial direction 66 through each tube 52. The temperature of the compressed air may range from approximately 260 to 538° C., 315 to 482° C., or 371 to 427° C. The fuel nozzle 12 includes the fuel flow path 68 that extends through the fuel conduit 42, through the plurality of impingement cooling orifices 150, through the gaps 164, through the chamber 48, and into the fuel inlets 142. Fuel enters the fuel nozzle 12 via the external feed 214 and flows in the axial direction 66 through the fuel conduit 42 toward the second baffle 154 (e.g., impingement cooling plate 159). The temperature of the fuel may range from approximately −20 to 500° C., 15 to 200° C., 21 to 100° C., or 26 to 38° C. As the fuel passes the first portion 218 of the first baffle 152, a portion of the fuel flows in a generally radial direction 202 between the first and second baffles 152 and 154 as indicated by arrow 223, where the fuel is directed through the plurality of impingement cooling orifices 150 into gap 157 between the second baffle 154 and the downstream wall portion 49. The fuel flowing through the plurality of impingement orifices 150 in axial direction 66, as indicated by arrows 174, impingement cools the downstream wall portion 49. The fuel within the gap 157 enters the gap 164 between the sleeves 222 and the tubes 52, as indicated by arrows 224, and flows in axial direction 168 as indicated by arrow 170. Fuel flowing through the gaps 164 convectively cools the plurality of tubes 52. Fuel directed through the gaps 164 then travels towards and enters the fuel inlets 142 of the tubes 52, as indicated by the arrows 178, where each tube 52 mixes the air with fuel from the fuel inlet 142 and injects the air-fuel mixture 148 via the air-fuel mixture outlet 146 into the combustion region 50. These cooling features enable the fuel nozzle 12 to use the fuel to cool these components without the need for superfluous flow streams such as air or water. In addition, these cooling features increase the operability (e.g., enabling operation at a slightly higher fuel pressure ratio) and durability of the fuel nozzle 12.

Technical effects of the disclosed embodiments include systems to cool components of the fuel nozzle 12 (e.g., multi-tube fuel nozzle) using the fuel as the coolant. The embodiments disclosed herein include cooling features such as impingements orifices 150 and gaps 164 for impingement cooling and convective cooling, respectively, of the downstream wall portion 49 of the fuel nozzle body 45 (e.g., fuel nozzle head) and/or the plurality of tubes 52 (e.g., premixing tubes) of the fuel nozzle 12. These cooling features enable the fuel nozzle 12 to use the fuel to cool these components without the need for superfluous flow streams such as air or water. In addition, these cooling features increase the operability (e.g., enabling operation at a slightly higher fuel pressure ratio) and durability of the fuel nozzle 12.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
   a multi-tube fuel nozzle having a longitudinal axis, comprising:
     a fuel nozzle head comprising an outer wall surrounding a chamber, wherein the outer wall comprises a downstream wall portion configured to face a combustion region;
     a plurality of tubes extending through the chamber to the downstream wall portion, wherein each tube of the plurality of tubes comprises an upstream portion, a downstream portion, and at least one fuel inlet disposed at the upstream portion, wherein each tube is configured to receive air and mix the air with fuel from the at least one fuel inlet; and
     a fuel conduit comprising a first baffle and a second baffle disposed within the chamber spaced apart from one another, the first and second baffles extending radially relative to the longitudinal axis, the second baffle being disposed between the first baffle and the downstream wall portion, the second baffle does not contact the outer wall, and the plurality of tubes extends through the first and second baffles, wherein the fuel conduit comprises a plurality of impingement cooling orifices disposed on the second baffle, wherein a fuel flow path extends through the fuel conduit, through the impingement cooling orifices, through the chamber, and into the at least one fuel inlet of each tube.

2. The system of claim 1, wherein the plurality of impingement cooling orifices are configured to direct fuel to impingement cool the downstream wall portion.

3. The system of claim 1, wherein each tube of the plurality of tubes extends through a first opening in the first baffle and a second opening in the second baffle, the first and second openings are oversized relative to the tube to define a first gap between the first baffle and the tube and a second gap between the second baffle and the tube, respectively, the first gap is configured to convectively cool the tube, and the second gap is configured to convectively cool the tube and the downstream wall portion.

4. The system of claim 3, wherein each first gap and second gap is configured to shrink in response to thermal expansion of the tube to increase fuel flow through the plurality of impingement cooling orifices.

5. The system of claim 1, wherein the fuel conduit comprises at least one floating baffle configured to float relative to the plurality of tubes.

6. The system of claim 5, wherein the second baffle comprises the at least one floating baffle.

7. The system of claim 1, the system comprising a turbine combustor or a gas turbine engine having the multi-tube fuel nozzle.

8. A system comprising:
   a turbine combustor comprising:
     a multi-tube fuel nozzle coupled to the turbine combustor, wherein the multi-tube fuel nozzle comprises:
     a fuel nozzle body comprising an outer wall surrounding a chamber;
     a plurality of tubes extending through the chamber, wherein each tube of the plurality of tubes comprises an air inlet, a fuel inlet, and an air-fuel mixture outlet;
     at least one baffle disposed with chamber, wherein the at least one baffle does not contact the outer wall and the at least one baffle comprises a plurality of impingement cooling orifices configured to direct fuel to impingement cool the multi-tube fuel nozzle, and wherein the at least one baffle extends radially relative to a longitudinal axis of the multi-tube nozzle and the plurality of tubes extends through the at least one baffle though a plurality of openings in the baffle; and
     wherein each tube of the plurality of tubes extends through one of the plurality of openings, each opening of the plurality of openings is oversized relative to the respective tube to define a gap, and each gap is configured to direct the fuel to convectively cool the respective tube or the outer wall.

9. The system of claim 8, wherein the plurality of impingement cooling orifices are configured to direct the fuel to impingement cool the outer wall or the plurality of tubes.

10. The system of claim 8, wherein the at least one baffle is a floating baffle configured to float relative to the plurality of tubes.

11. The system of claim 8, wherein each gap is configured to shrink in response to thermal expansion of the respective tube to increase fuel flow through the plurality of impingement cooling orifices.

12. The system of claim 8, wherein a fuel flow path extends through the impingement cooling orifices, through the chamber, and into the fuel inlet of each tube.

13. A system, comprising:
    a multi-tube fuel nozzle, comprising:
      a fuel nozzle body comprising an outer wall surrounding a chamber;
      a plurality of tubes extending through the chamber from a first wall portion to a second wall portion of the outer wall, wherein each tube of the plurality of tubes comprises an air inlet, a fuel inlet, and an air-fuel mixture outlet; and
      a fuel conduit comprising a first baffle and a second baffle disposed within the chamber spaced apart from one another, the first and second baffles extending radially relative to the longitudinal axis, the second baffle does not contact the outer wall, and the plurality of tubes extends through the first and second baffles, wherein the fuel conduit comprises a plurality of impingement cooling orifices disposed on the first or second baffle and configured to direct fuel to impingement cool the outer wall, and the fuel conduit comprises a plurality of openings disposed on both the first baffle and the second baffle and configured to direct the fuel to convectively cool the plurality of tubes and the outer wall.

14. The system of claim 13, wherein each tube of the plurality of tubes extends through a first opening in the first baffle and a second opening in the second baffle, and the first and second openings are oversized relative to the tube to define gaps between the respective first and second baffles and the tube.

15. The system of claim 14, wherein each gap is configured to shrink in response to thermal expansion of the tube to increase fuel flow through the plurality of impingement cooling orifices.

16. The system of claim 13, wherein a fuel flow path extends through the openings and the impingement cooling orifices, through the chamber, and into the fuel inlet of each tube.

* * * * *